US006464760B1

(12) United States Patent
Sham et al.

(10) Patent No.: US 6,464,760 B1
(45) Date of Patent: Oct. 15, 2002

(54) ULTRAVIOLET AIR PURIFIER

(76) Inventors: John C. K. Sham, 12/F. Kin Teck Industrial Bldg., 26 Wong Chuk Hang Road, Aberdeen (HK); Kumkit Kunavongvorakul, 889 Thai C.C. Tower, 18th Floor, Rm 183 South Sathorn Road, Yannawa, Sathorn Bangkok (TH), 10120

(*) Notice: Subject to any disclaimer, the term of this patent is extended or adjusted under 35 U.S.C. 154(b) by 0 days.

(21) Appl. No.: 09/671,583

(22) Filed: Sep. 27, 2000

(51) Int. Cl.[7] .......................... B01D 53/04; B01D 29/56
(52) U.S. Cl. ..................... 96/117.5; 96/135; 96/142; 96/224; 96/414; 96/418; 55/318; 55/356; 55/471; 55/485; 55/487
(58) Field of Search ..................... 95/141, 143, 273, 95/274, 286, 287, 291; 96/134–136, 138, 142, 223, 224, 414–416, 117, 117.5; 55/318, 356, 467, 471, 485, 487

(56) References Cited

U.S. PATENT DOCUMENTS

| | | | | |
|---|---|---|---|---|
| 2,638,644 A | * | 5/1953 | Rauhut | 96/142 |
| 2,945,554 A | * | 7/1960 | Berly | 96/142 X |
| 3,299,620 A | * | 1/1967 | Hollingworth | 96/142 X |
| 3,745,750 A | * | 7/1973 | Arff | 96/142 X |
| 3,757,495 A | | 9/1973 | Sievers | 55/279 |
| 3,804,942 A | * | 4/1974 | Kato et al. | 96/142 X |
| 3,844,741 A | | 10/1974 | Dimitrik | 55/102 |
| 4,118,191 A | | 10/1978 | Bohnensieker | 55/279 |
| 4,210,429 A | | 7/1980 | Golstein | 55/279 |
| 4,385,911 A | * | 5/1983 | Popeil et al. | 96/136 X |
| 4,666,478 A | * | 5/1987 | Boissinot et al. | 96/135 |
| 4,701,195 A | * | 10/1987 | Rosendall | 96/136 |
| 4,750,917 A | | 6/1988 | Fujii | 55/6 |
| 5,047,072 A | * | 9/1991 | Wertz et al. | 96/136 X |
| 5,060,805 A | | 10/1991 | Fujii et al. | 209/3 |
| 5,180,405 A | * | 1/1993 | Kuan | 96/224 X |
| 5,185,015 A | | 2/1993 | Searle | 55/102 |
| 5,225,167 A | | 7/1993 | Wetzel | 422/121 |
| 5,288,298 A | * | 2/1994 | Aston | 96/135 |
| 5,330,722 A | | 7/1994 | Pick et al. | 422/121 |
| 5,399,319 A | | 3/1995 | Schoenberger | 422/121 |
| 5,453,049 A | | 9/1995 | Tillman, Jr. et al. | 454/228 |
| 5,523,057 A | | 6/1996 | Mazzilli | 422/121 |
| 5,612,001 A | | 3/1997 | Matschke | 422/121 |
| 5,616,172 A | | 4/1997 | Tuckerman et al. | 96/16 |
| 5,632,806 A | | 5/1997 | Galassi | 96/16 |
| 5,656,242 A | | 8/1997 | Morrow et al. | 422/121 |
| 5,833,740 A | | 11/1998 | Brais | 96/16 |
| 5,837,207 A | | 11/1998 | Summers | 422/121 |
| 6,053,968 A | * | 4/2000 | Miller | 96/223 X |
| 6,149,717 A | * | 11/2000 | Satyapal et al. | 96/224 X |
| 6,322,614 B1 | * | 11/2001 | Tillmans | 96/224 X |

* cited by examiner

Primary Examiner—Robert H. Spitzer
(74) Attorney, Agent, or Firm—Peter S. Canelias (57) ABSTRACT

The invention relates to a portable air sterilization and filtration apparatus for removing contaminants from the ambient atmosphere, having a housing with an inlet opening and an outlet opening, filter media and ultraviolet light source, and a motorized fan for maintaining a flow of air through the housing from the inlet opening to the outlet opening. The invention also includes easy access to the filter medium and to the ultraviolet light sources for periodic replacement or cleaning, and integrates a safety lock feature whereby the removal of the filter or the removal of an ultraviolet light source would open the power circuit to the ultraviolet light source, preventing accidental irradiation of the user. The ultraviolet light sources also activate an indicator light viewable by the user when the ultraviolet light sources are energized. The invention employs a three filter media system to remove contaminants from the air stream generated within the device by the motorized fan, including a sponge filter, a HEPA type filter (high efficiency particulate air filter), which will remove 99.97% of the airborne particles of the size of 0.3 microns or larger, and an activated charcoal filter. The ultraviolet light source is disposed so as to irradiate the downstream side of the activated charcoal filter during operation of the unit to provide germicidal activity to the filter's downstream surface and to the air stream as the air stream emerges from the filter prior to its discharge through the outlet opening to return to the ambient. atmosphere.

6 Claims, 9 Drawing Sheets

ULTRAVIOLET AIR PURIFIER

BACKGROUND OF THE INVENTION

The present invention pertains to a portable air purifier for removing irritating or harmful impurities from the air, and for sterilizing the air by means of ultraviolet radiation. Pollens, lung damaging dust, smoke, bacteria, viruses, dust mites, and a number of other irritants and microorganisms are commonly found in the ambient atmosphere of an enclosed area. The concentration of such irritants and microorganisms becomes most acute during the winter months, where insulation and the congregation of persons indoors exacerbates the problem of indoor pollution. Persons with a pre-existing condition are especially vulnerable to suffer illnesses and irritation from contacting such pollutants. Persons afflicted with allergies, emphysema, asthma and other respiratory ailments are examples. Persons with lowered, impaired or otherwise compromised immune systems are especially vulnerable to infection from the bacteria and viruses found in the ambient atmosphere. It has been recognized that filtration of air through some air purification means can combat some of the effects of particulate contamination. Electrostatic filters have been employed to this effect in the prior art. Multiplefilter type systems have also been used in conjunction with ultraviolet germicidal radiation, such as that disclosed in U.S. Pat. No. 4,210,429 to Jerome J. Golstein, issued on Jul. 1, 1980. It has long been recognized that pathogens can be destroyed in the air, in water or on exposed surfaces if they are irradiated with ultraviolet light at the wavelength of about 254 nanometers, which is the preferred wavelength for germicidal use of ultraviolet radiation.

The invention relates to a portable air sterilization and filtration apparatus for removing contaminants from the ambient atmosphere with an improved configuration and method whereby the efficacy of a relatively compact unit in removing indoor pollutants and destroying pathogens is enhanced. More particularly, the preferred embodiment of the invention is a free standing, self-contained unit powered from a conventional AC source (although the unit could be operated from storage batteries rather than an AC source); having a housing with a removable front cover, an inlet opening and an outlet opening, filter media to filter an air stream which flows from the inlet opening to the outlet opening; an ultraviolet light source to provide germicidal radiation to the air stream and to a surface of a filter medium, and a motorized fan for maintaining a flow of air through the housing from the inlet opening to the outlet opening. The unit is compact and attractive, and has a high efficiency of air purification and sanitization using a relatively short air The invention also includes easy access to the filter media and to the ultraviolet light source for periodic inspection, replacement or cleaning, and integrates a safety lock feature whereby the removal of a filter or the removal of an ultraviolet light source would open the power circuit to the ultraviolet light source, preventing accidental irradiation of the user. The power circuit for the ultraviolet light source also activates indicator lights (preferably standard incandescent light bulbs) viewable by the user when the ultraviolet light source is energized. The invention employs a specific, three filter media system to remove contaminants from the air stream generated within the device by the motorized fan. The air stream passes through a sponge filter, a HEPA type filter (high efficiency particulate air filter), which will remove 99.97% of the airborne particles of the size of 0.3 microns or larger, and an activated charcoal filter. It is only after the air stream has been filtered by the successive filter media that it is irradiated to destroy pathogens. The ultraviolet light source is disposed so as to irradiate the downstream side of the activated charcoal filter during operation of the unit to provide germicidal activity to the filter's downstream surface and to the air stream as the air stream emerges from the filter prior to its discharge through the outlet opening to return to the ambient atmosphere. It is this combination of three-stage filtering and subsequent radiation of the air stream itself together with the downstream side of the last filter medium that results in improved filtration and germicidal activity. The air stream purified by this combination is effectively more pure than that achieved by prior art combinations.

In addition to the improved efficacy of the combination, safety features are employed to prevent accidental irradiation of the user in a variety of circumstances. In particular, easy access is provided to the filter media and to the ultra violet light source for easy inspection, replacement or cleaning. It is therefore possible for a user to accidentally open the unit to inspect the filter media or ultraviolet light source where the ultraviolet light source is turned on and emitting radiation. To prevent this occurrence, if a user opens the front cover to inspect or replace any of filters or the UV light source, and fails to turn off either the main switch or the separate UV light switch, then safety micro-switches are disengaged, interrupting the power supply to the UV light source and causing the UV light source to immediately cease providing radiation. Thus, the user is protected from accidental UV radiation exposure when opening the unit with both power switches in the on position. Another safety feature is incorporated into the filter media docks, where a user may attempt to operate the device with one of the filter media removed or improperly seated in the dock. Safety micro-switches disengage the supply of power to the device if the filters are not properly seated.

Yet another safety feature is a separate power switch for the UV light source, independent of the main power switch for the device which operates the blower. A separate switch enables the user to operate the device for filtration only, and not for UV sanitization. Another alternative is the use of a double viewing window to permit the user to actually observe the UV light source without being exposed to harmful radiation. A double window is employed to effect this, where one window is substantially transparent and the second window is treated to obstruct harmful UV radiation.

SUMMARY OF THE INVENTION

In accordance with the present invention, there is provided an improved ultraviolet air purifier that employs ultraviolet radiation to sterilize a filter and the air stream drawn through the purifier;

Another object of this invention is to provide an improved ultraviolet air purifier that employs an indicator light to alert the user when the ultraviolet light sources are energized;

Another object of this invention is to provide for the downstream irradiation of the filter so as to enhance the germicidal effects of the ultraviolet irradiation;

Another object of this invention is to provide a high efficiency filter medium of the HEPA type to maximize the percentage of small particulate matter entrapped by the filter medium;

Another object of this invention is to provide a safety mechanism by which the removal of the filter will interrupt the power circuit to prevent accidental irradiation of the user;

Another object of this invention is to provide a safety mechanism by which the removal of the ultraviolet light sources will interrupt the power circuit to prevent accidental irradiation of the user;

Another object of this invention is to provide for the easy access and replacement of the filter and of the ultraviolet light sources.

BRIEF DESCRIPTION OF THE DRAWINGS

The above-mentioned and other features and objects of this invention and the manner of obtaining them will become apparent and the invention itself will be best understood by reference to the following description of an embodiment of the invention taken in conjunction with the accompanying drawings, wherein.

DETAILED DESCRIPTION

The invention relates to a portable air purification and sanitation unit for removing contaminants from the ambient atmosphere, having a housing with an inlet opening and an outlet opening, the inlet opening preferably through the front cover, and the outlet preferably directed upwardly, so that the rear of the unit may be placed against a wall without inhibiting the exhaustion of air from the air outlet, and increase dispersion of the purified air into the ambient atmosphere. The invention also has filter media and ultraviolet light source, and a motorized fan for maintaining a flow of air through the housing from the inlet opening to the outlet opening. The invention also includes easy access to the filter medium and to the ultraviolet light sources for periodic replacement or cleaning, and integrates a safety lock feature whereby the removal to the filter or the removal of an ultraviolet light source would open the power circuit to the ultraviolet light source, preventing accidental irradiation of the user. The ultraviolet light sources also activate an indicator light viewable by the user when the ultraviolet light sources are energized. The invention employs a three filter media system to remove contaminants from the air stream generated within the device by the motorized fan, including a sponge filter, a HEPA type filter (high efficiency particulate air filter), which will remove 99.97% of the airborne particles of the size of 0.3 microns or larger, and an activated charcoal filter. The ultraviolet light source is disposed so as to irradiate the downstream side of the activated charcoal filter during operation of the unit to provide germicidal activity to the filter's downstream surface and to the air stream as the air stream emerges from the filter prior to its discharge through the outlet opening to return to the ambient atmosphere.

Figure 1:
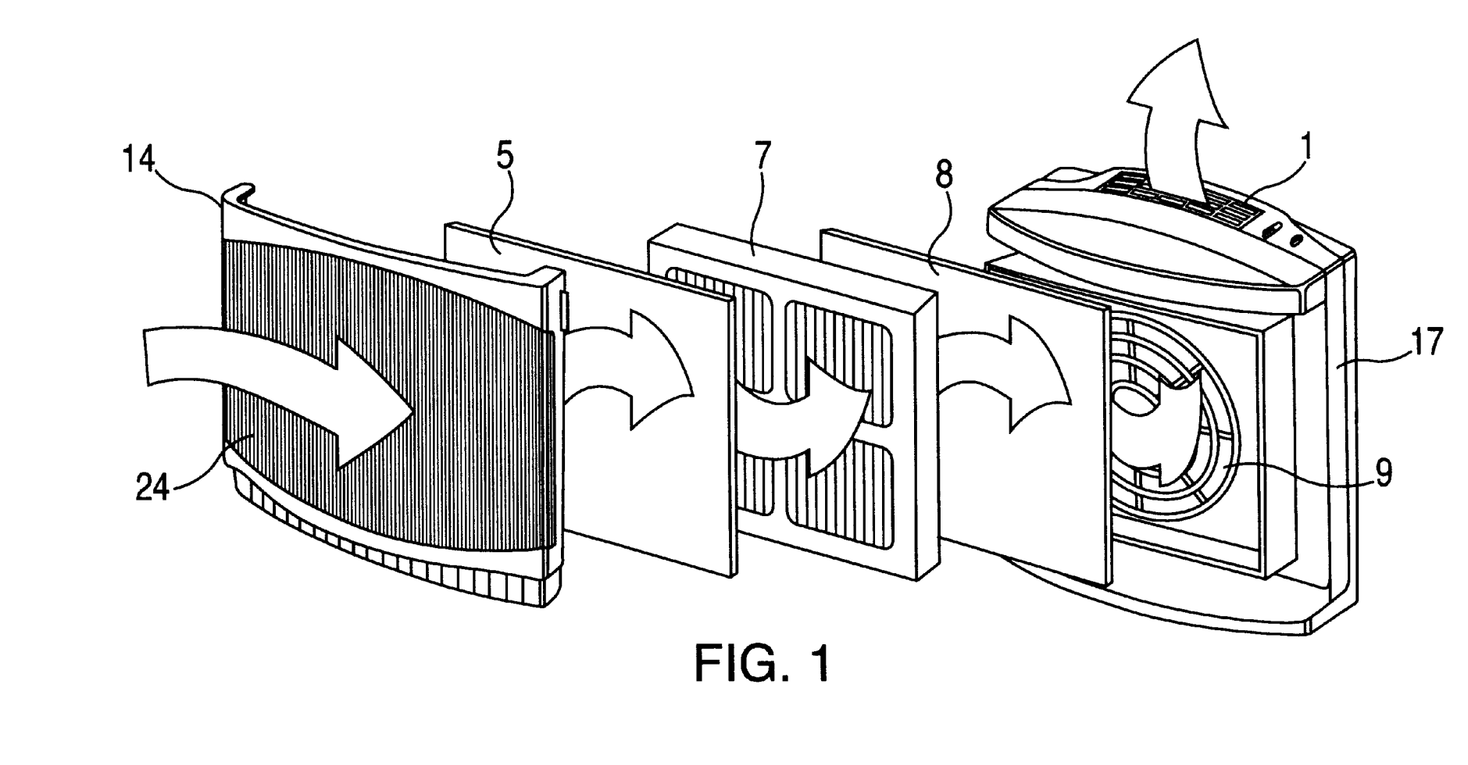
FIG. 1 is a view of the preferred embodiment of the invention showing the front housing and filter media separated from the rear housing.

Referring now to the drawings, FIG. 1 illustrates a preferred embodiment of the invention. The figure shows a rear housing (17) which incorporates a blower unit having a fan (9) for generating an air stream and an air outlet (1) for discharge of the air stream into the ambient atmosphere. The air outlet (1) is disposed so that the purified air stream is directed upwards relative to the unit, allowing the rear of the unit to be placed against a wall or other structure without interfering with the exhaust of purified air. FIG. 1 also shows the front cover (14) with metal mesh grill (24). In succession after the front cover (14) are a sponge filter (5), a HEPA filter (7) and an active carbon filter (8). The front cover (14), the sponge filter (5) the HEPA filter (7) and the active carbon filter (8) are in fluid (air) communication with each other id arranged in tandem, so that an air stream generated by the operation to the tan (9) is drawn into and through the front cover (14) from the ambient atmosphere, where the particulate and bacterial laden air is drawn through the succession of filter elements in the order in which they appear, namely the sponge filter (5), the HEPA filter (7), and the active carbon filter (8).

Figure 2:
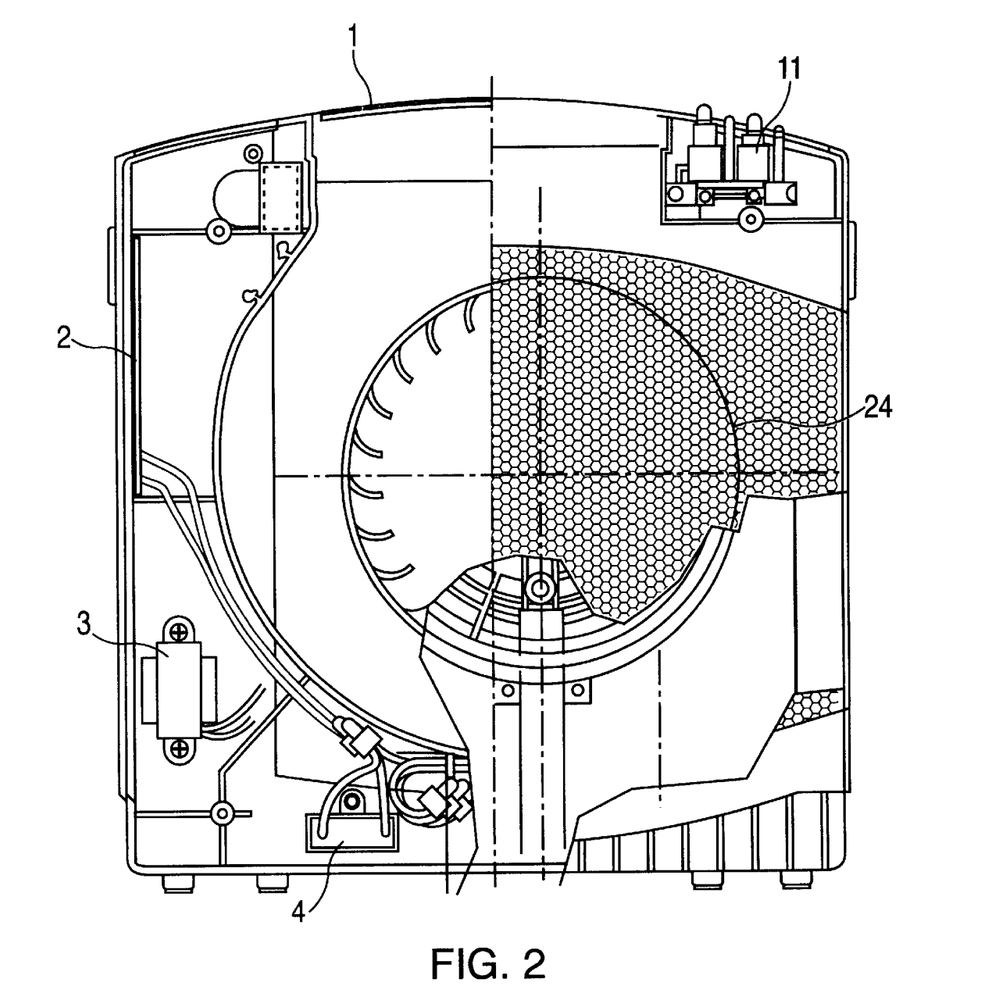
FIG. 2 is a front section view of a preferred embodiment.
Figure 3:
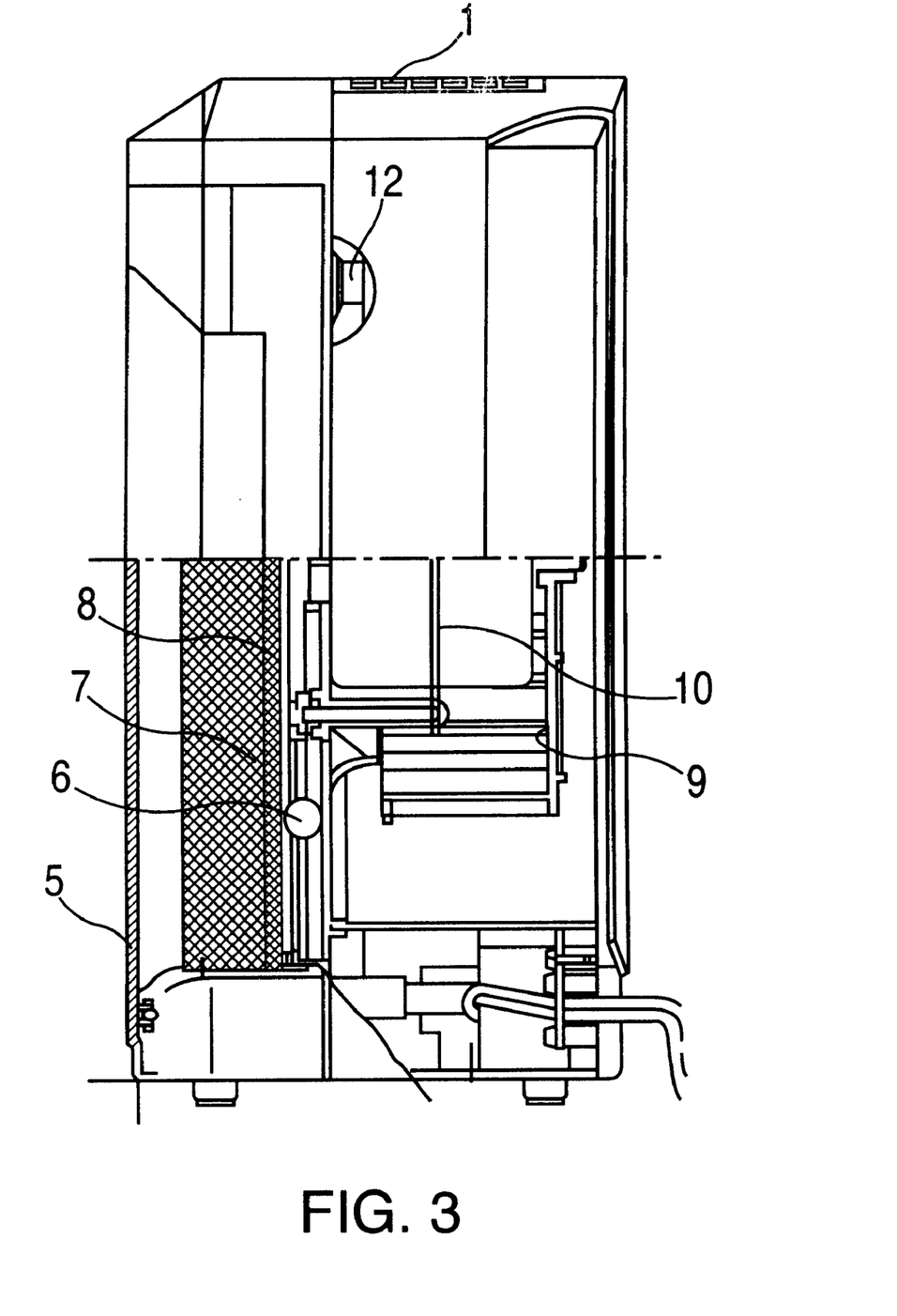
FIG. 3 is a side section view of a preferred embodiment.

FIG. 2 shows a front section view of the preferred embodiment, with a partial view of the front cover (14) and metal mesh grill (24). The location of a printed circuit board (2) is shown, which controls operation of the electric circuit supplying power to the unit. The locations of a transformer (3) and a startup capacitor (4) are also shown. A separate on/off control switch (11) is supplied to enable the user to selectively turn on and off the UV light source (6), as shown in FIG. 3. A motor (10) supplies power to turn fan (9), which generates the air flow through the unit.

Figure 4:
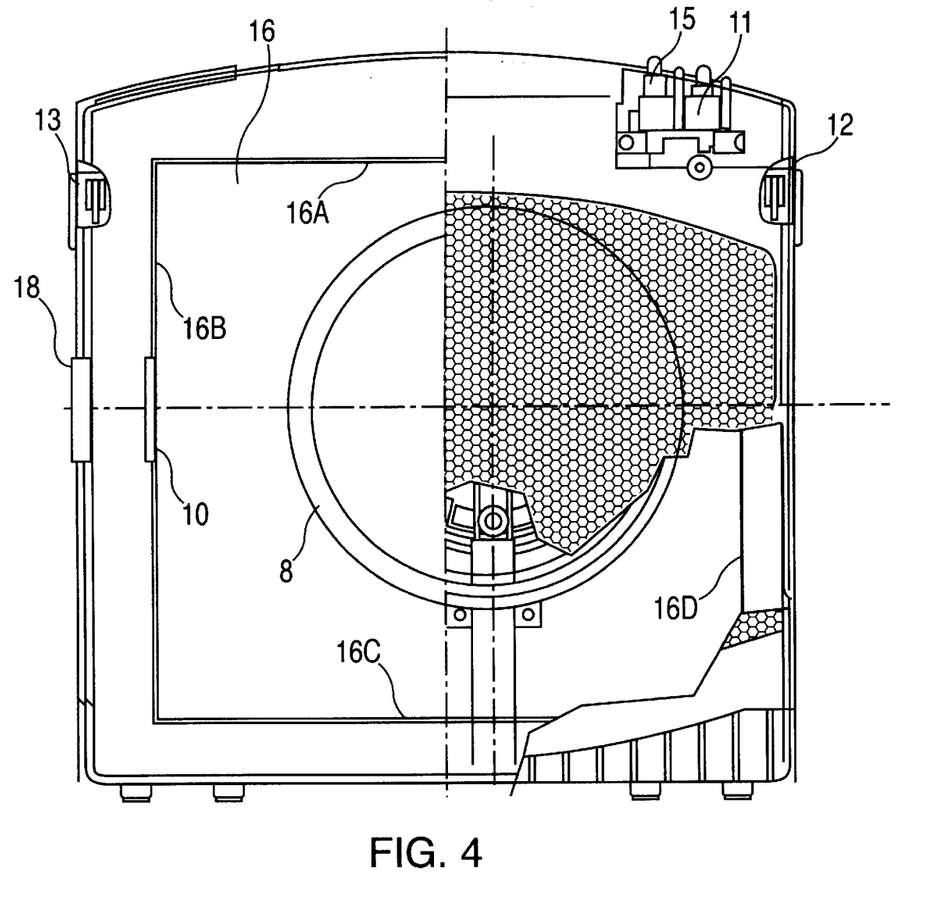
FIG. 4 is a front section view of a preferred embodiment showing the interior of the UV sterilization chamber.
Figure 5:
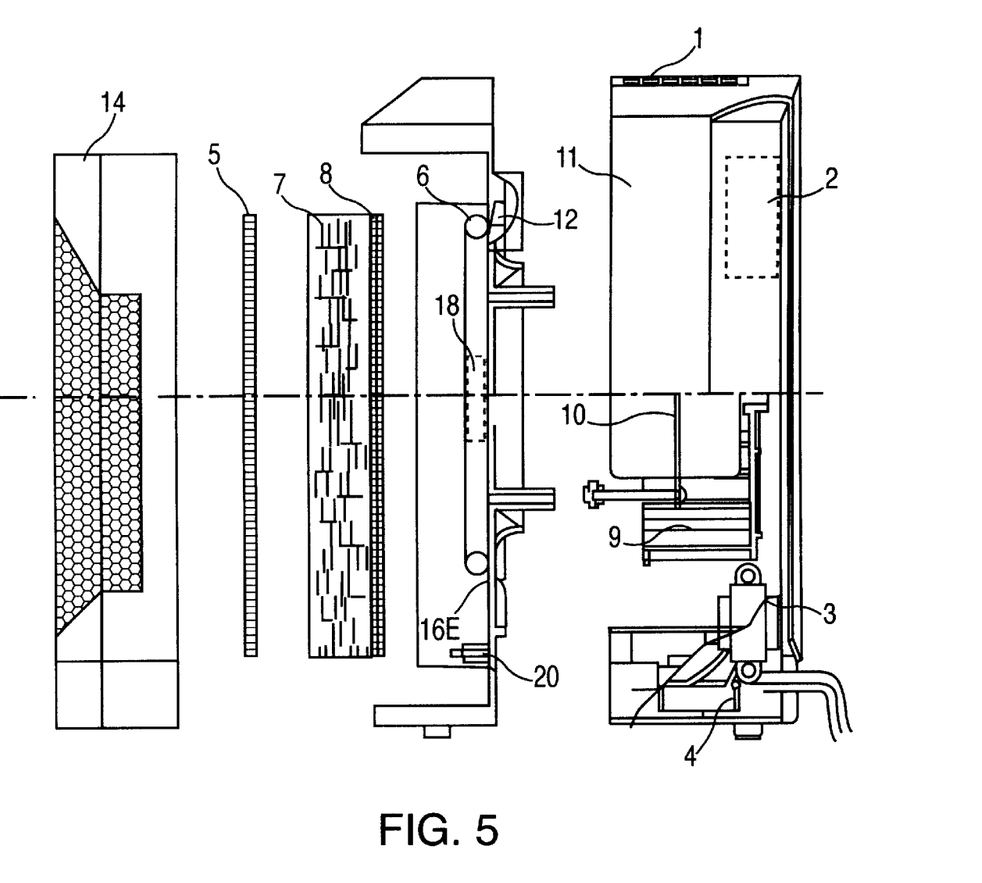
FIG. 5 is a side section view of a preferred embodiment of the invention showing the front housing and filter media separated from the rear housing.

FIG. 4 shows a front section view of the unit, with the formation of the UV sterilization chamber (16) by walls 16A, 16B, 16C and 16D. FIG. 5 shows the location of the fifth wall (16E) which functions as the rear wall of the chamber (16). The downstream side of the active carbon filter (8), which immediately precedes the UV sterilization chamber (16), functions as the sixth wall of the sterilization chamber (16), exposing the downstream side of the active carbon filter (8) to UV radiation from UV light source (6). The inner walls 16A-E and the downstream side of active carbon filter (8) enclose a UV light source (6) which irradiates the downstream side of the active carbon filter (8) as well as the incoming air stream.

The UV light source can be of several types illustrated in FIGS. 9, 10, 11 and 12. Preferably, where a round UV bulb (FIG. 9) or U-shaped UV bulb (FIG. 10) is selected as a UV light source, only one UV bulb will be sufficient for purposes of the invention. If a straight bulb (FIG. 1) or H-shaped bulb (FIG. 12) is selected, then a plurality (preferably two) of such UV bulbs should be used in order to achieve the purposes of the invention.

Figure 6:
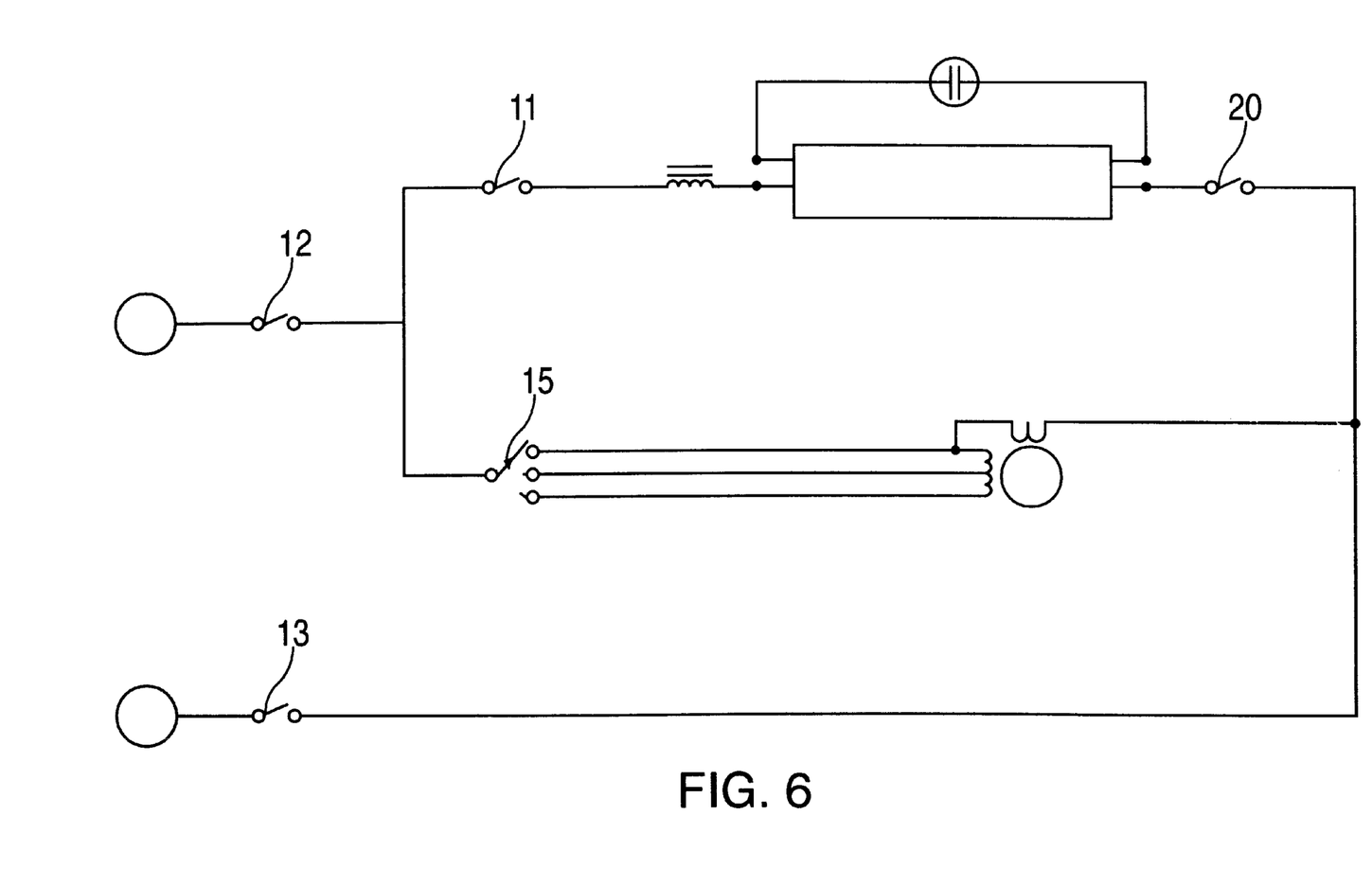
FIG. 6 is a schematic diagram of the power and switching circuit where a double pane window is used instead of indicator light bulbs.

A preferably transparent viewing window (18) is provided on the side of the housing at the inner wall (16B) disposed so that the UV light source (6) can be observed by the user. A second viewing window (19) is disposed in alignment with viewing window (18) to protect the user from exposure to UV radiation emanating from the UV light source. The second viewing window (19) is treated to impede the transmission of harmful UV radiation to the eyes of the viewer. The second viewing window (19) is preferably formed from a tinted material such as plastic, with the ability to transmit sufficient light from the UV light source (6) to apprise the viewer as to whether the UV light source (6) is activated, while preventing the transmission of UV radiation at levels harmful to the eyes of the observer. FIG. 6 shows an electrical circuit where the viewing window assembly (18) (19) is used in place of the indicator bulbs described below.

Figure 7:
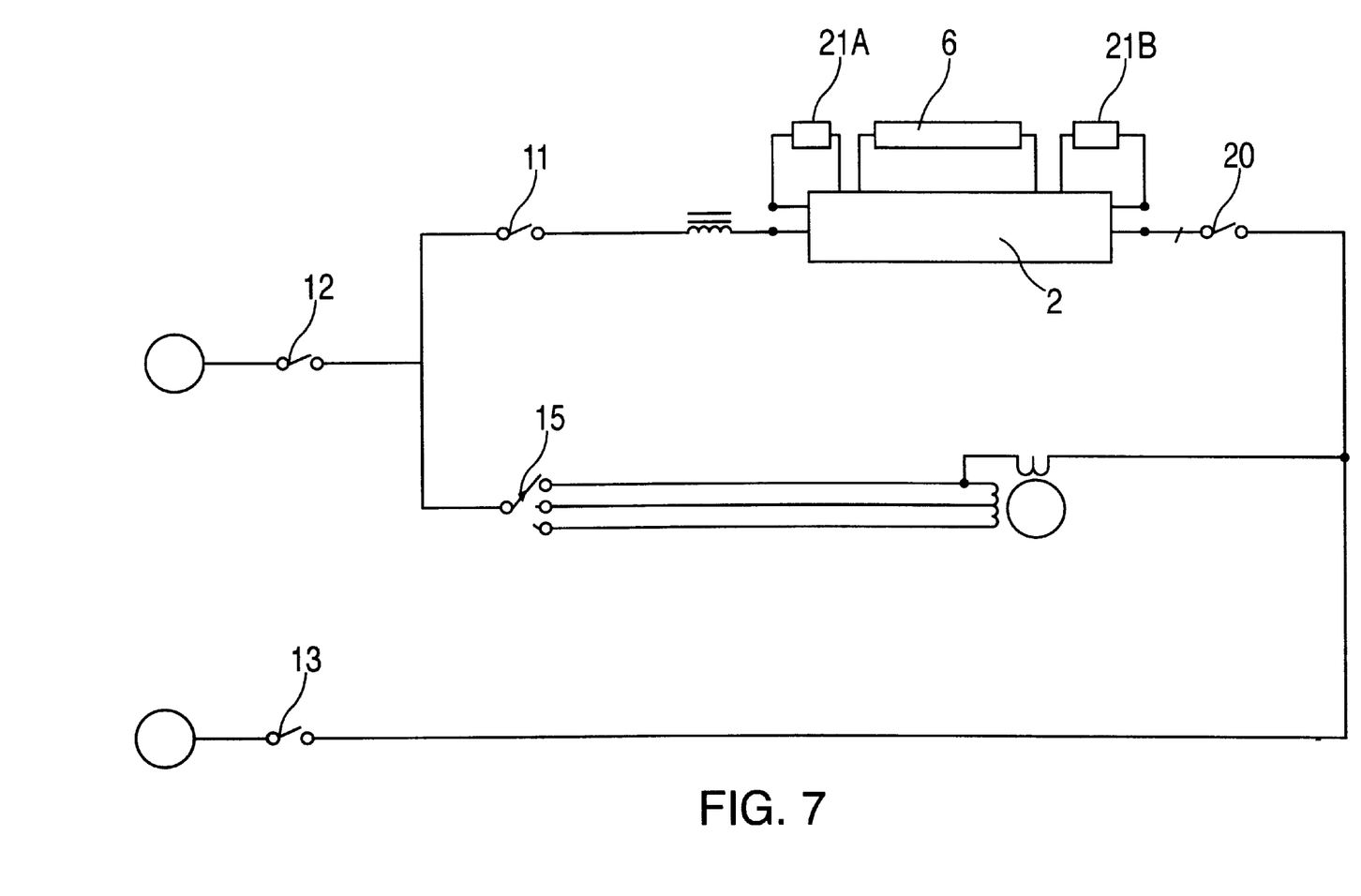
FIG. 7 is a schematic diagram of the power and switching circuit where two indicator bulbs are employed.
Figure 8:
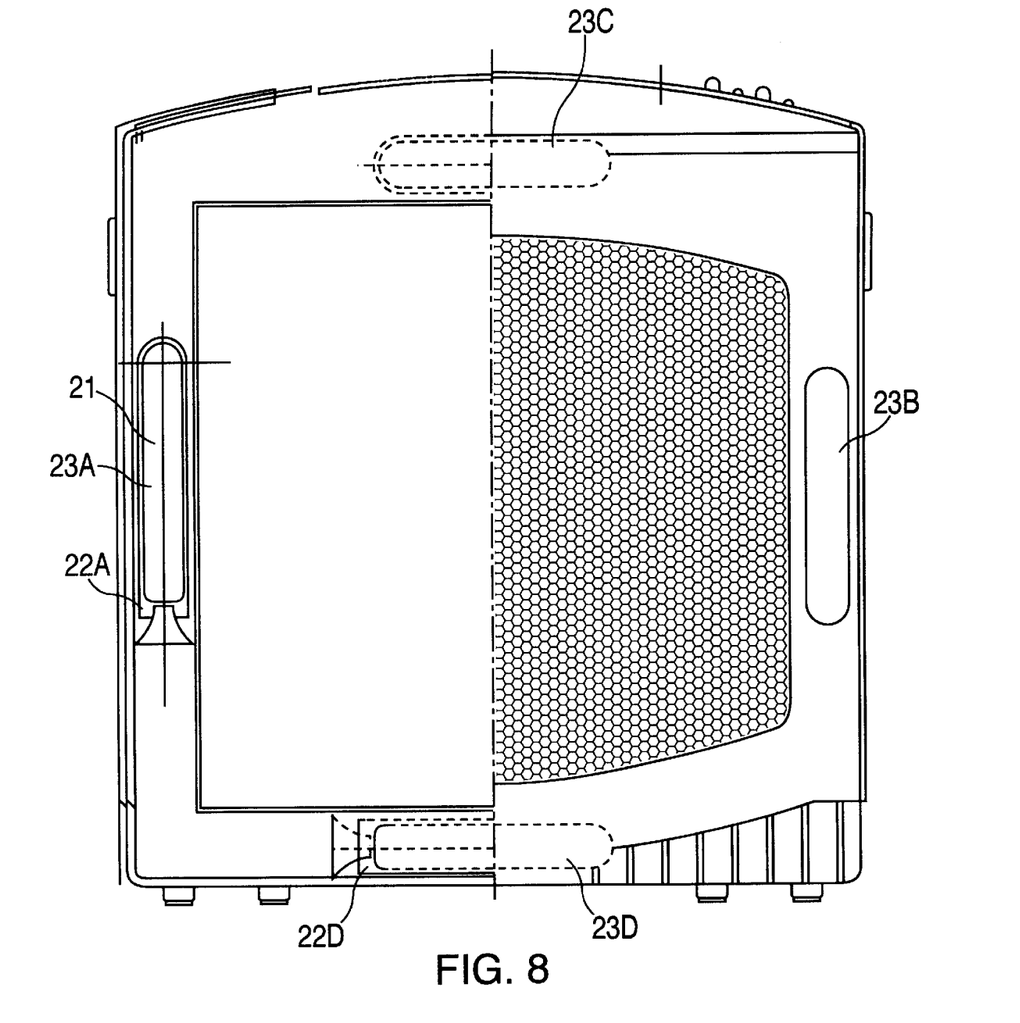
FIG. 8 is a front section view of a preferred embodiment showing the placement of indicator bulbs and viewing windows.
Figure 9:
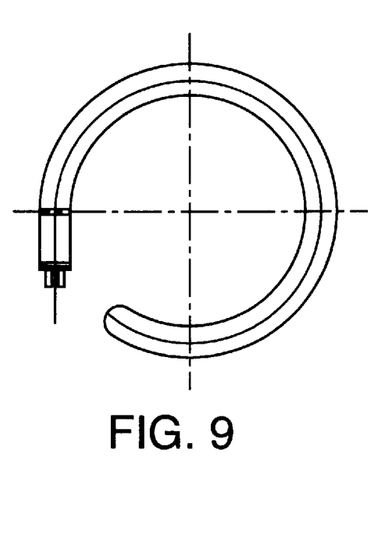
FIG. 9 is a view of a UV light source.
Figure 10:
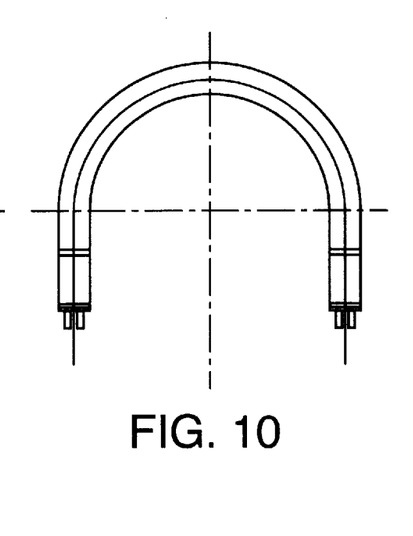
FIG. 10 is a view of an alternate UV light source.
Figure 11:
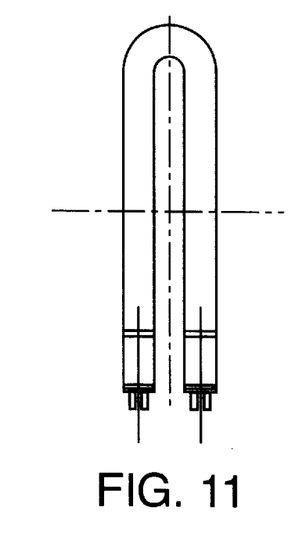
FIG. 11 is a view of an alternate UV light source.
Figure 12:
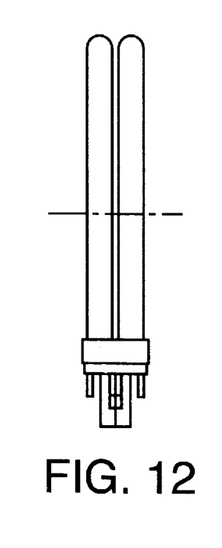
FIG. 12 is a view of an alternate UV light source.

An alternative (or as an added component) to the combination of viewing windows (18) and (19) is a transparent window (23) preferably formed from a substantially transparent, thermoplastic material. Preferably two standard incandescent light bulbs (21a) (21b) are located behind the viewing window (23). The light bulbs (21) are electrically connected to the UV light source (6), and preferably flash on and off in rapid succession when the UV light source (6) is activated. FIG. 7 shows the electric circuit diagram where two light bulbs (21a and 21b) are installed at both the right end and the left end sides of front cover (14). Viewing from the front (FIG. 8) each side is provided with a reflector (22 A–D) behind each light bulb (a–d) for increasing the viewability of the light bulbs. The unit is provided with a plurality of viewing windows with transparedt covers (23A–D) to increase visibility. Thus, the user may visually observe that the UV light source (6) is engaged without actually viewing the UV light source (6) directly. The danger of exposure to UV radiation is consequently greatly reduced.

The main on/off switch (15) is shown in the upper portion of the rear housing (17). A separate on/off switch (11) controls the flow of power to the UV light source (6). The UV on/off switch (11) can only be activated in the on position when the main switch (15) is in the on position. Micro-switches (12) and (13) are also shown. The micro-switches are connected on the printed circuit or PC board (2), which controls the power interrupt safety feature of the invention. The micro-switches control the power flow relative to the UV light source (6), interrupting power flow by opening the power circuit under certain conditions. The circuit design is shown in FIG. 7 with two indicator bulbs (21A and 21B). The safety micro-switches are installed between the front cover (14) and the inner housing. If a user opens the front cover (14) to inspect or replace any of filter means (5) (7) or (8) or the UV light source (6), and fails to turn off either the main switch (15) or the UV light switch (11), then the safety micro-switches (12) (13) are not engaged, thus interrupting the power supply to the UV light source (6) causing the UV light source to immediately cease providing radiation. Thus, the user is protected from accidental UV radiation exposure when opening the unit with both power switches in the on position.

An additional safety micro-switch (20) is provided and designed to interrupt power to the UV light source (6) when the HEPA filter is not installed. When the HEPA filter is installed in the device, it will activate the safety micro-switch (20) so as to permit power flow to the UV light source. If the HEPA filter is not properly installed so as to engage micro-switch (20), then power will not flow to the UV light source (6) even when the front cover (14) is properly closed and the safety inicro-switches (12) and (13) are engaged.

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:

1. An air purification and sanitation unit comprising:
   a housing having an internal wall defining a germicidal chamber;
   said housing having an air inlet located at a front portion of said housing, and an air outlet located at a portion of said housing downstream of said air inlet;
   a blower for generating an air stream from said air inlet to said air outlet;
   a first means for filtering said air stream, said first means operably engaged to said housing;
   a second means for tiltering said air stream, said second means operably engaged to said housing;
   a third means for filtering said air stream, said third means operably engaged to said housing;
   each of said means for filtering said air stream disposed in tandem with one another, so that said air stream is filtered stuccessively by said first means, said second means, and said third means;
   an ultra violet light source disposed so as to irradiate said chamber and said air stream, and being disposed so as to irradiate a downstream side of said third means for filtering said air stream;
   a safety circuit to interrupt power to said ultra violet light source where a means for filtering said air stream is not operably engaged.

2. An air purification and sanitation unit according to claim 1, wherein said safety circuit is configured to provide power to a safety indicator light where power is provided to said ultra violet light source.

3. An air purification and sanitation unit according to claim 1, wherein a viewing window is provided to allow a user to visually observe the ultra violet light source.

4. An air purification and sanitation unit according to claim 1, wherein said first means for filtering said air stream is comprised of sponge material.

5. An air purification and sanitation unit according to claim 1, wherein said second means for filtering said air stream is comprised of a high efficiency filter for trapping small particles down to 0.3 microns.

6. An air purification and sanitation unit according to claim 1, wherein said third means for filtering said air stream is comprised of activated carbon.

\* \* \* \* \*